United States Patent
Filho

[11] 3,719,996
[45] March 13, 1973

[54] ELLIPSOGRAPH

[76] Inventor: Sertorio Arruda Filho, Rua Aristides Espinola, 37/301, Rio de Janeiro, Brazil

[22] Filed: Aug. 27, 1971

[21] Appl. No.: 175,436

[30] Foreign Application Priority Data

March 15, 1971 Brazil .................................... 1634

[52] U.S. Cl. ............................................... 33/30 C
[51] Int. Cl. ............................................. B43l 11/04
[58] Field of Search ........................... 33/27 K, 30 C

[56] References Cited

UNITED STATES PATENTS

| 2,496,614 | 2/1950 | Arnason | 33/27 K |
| 2,498,798 | 2/1950 | Edwards | 33/30 C |
| 1,406,863 | 2/1922 | Hoffman et al. | 33/30 C |
| 2,690,013 | 9/1954 | MacGuire | 33/30 C |

Primary Examiner—Harry N. Haroian
Attorney—Emory L. Groff et al.

[57] ABSTRACT

An ellipsograph of the compass type having a multi-section centering leg, the medial portion of which is in the form of a crank. A bow-shaped pantograph is rotatably attached to the upper and lower sections of the centering leg and has a straight scriber leg connected thereto by means of a pair of pivoted links. A spring mounted on the upper portion of the pantograph urges the scriber leg against the peripheral edge of a circular modulus disc which is pivotally mounted on the medial portion of the centering leg opposite a scale on the pantograph.

5 Claims, 4 Drawing Figures

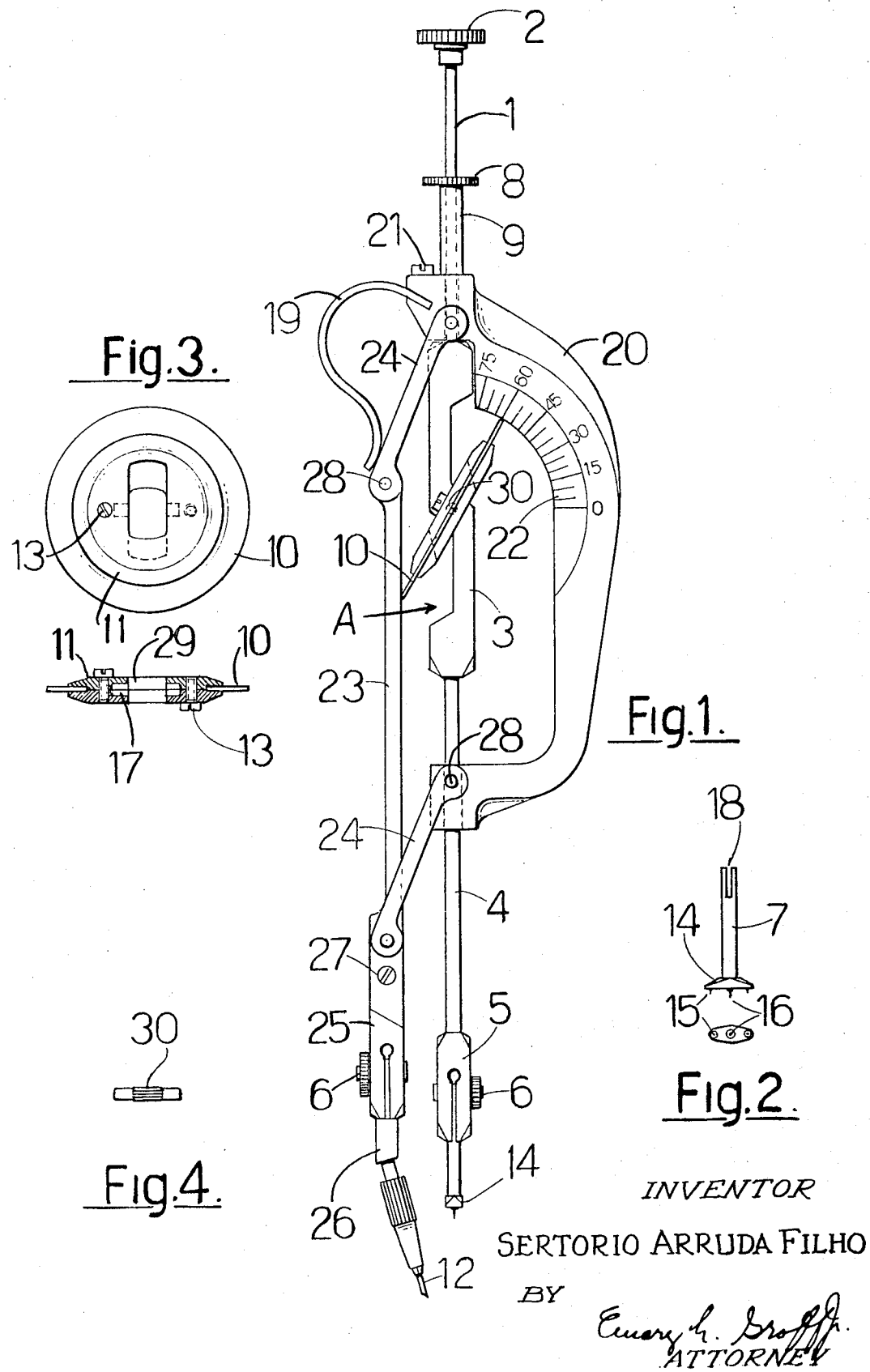

ELLIPSOGRAPH

This invention relates to a drafting instrument for the purpose of drawing ellipses. It is based on the fact that an ellipse is the orthogonal projection of a circle over a plane surface.

The drafting instrument according to my invention is made for the purpose of accomplishing such an orthogonal projection, using a disc mounted on a centering stem or leg as the guiding master circle or modulus. It is a mechanism providing a compound compass comprising, a pantograph with a bow upon which an angular scale is engraved, a straight leg with parallel links pivoted thereto and to the bow, the bow revolving around the centering stem or leg in contact with the periphery of the circular modulus, a compression spring which maintains said contact, a centering point, and a scriber point fixed at the extreme end of the straight leg of the pantograph to trace the orthogonal projection of the modulus over the plane of the drawing. As the two axes of an ellipse are different, the receding or approaching of the tracing point to the center of the ellipse is accomplished by the pantographical action and sliding motion of the bow along and around the stem of the compasses, thus keeping the scribing point always over the surface of the plan of drawing, and ensuring a constant pressure of the stylus over the drawing surface.

The centering leg where the circular modulus is pivoted has a crank to allow for the inclination of the modulus from 0° up approximately to 90°, covering a range of projection that makes it possible to obtain circular projection and ellipses passing through all angles up to a theoretically straight line as projections, depending on the angle selected.

The operation of the ellipsograph is the same and as simple as that of a common compass for circles, requiring only that the angle of the ellipse to be traced be set at the angular scale on the bow by inclining the modulus to the desired degree, thus fixing the minor axis automatically. The major axis is determined by setting the tracing point away or close to the centering point by measuring. The only care to be taken when operating the present device is that the three pointed center guide, or centering point, be placed along the major axis of the ellipse to be traced, having its longer pin at the center or crossing of the conjugated axes of the ellipse. Any kind or size of sllipses can be traced with this instrument within the range for which it was constructed, and for larger ellipses an extension arm can be added to the tracing point.

The details of my invention are set forth in the following description and illustrated in the accompanying drawings, in which:

FIG. 1 is a front elevation of the entire instrument.

FIG. 2 is the centering guide shown in plan and elevation, with its component parts.

FIG. 3 is the circular modulus shown in plan and sectional elevation, with its component parts.

FIG. 4 is the circular modulus securing pin shown in plan and elevation and its component parts.

Similar reference numerals refer to similar parts throughout the several views in the drawings and in the description.

Referring to FIG. 1, the instrument comprises a centering leg A including an upper portion 1 provided with a knurled knob 2 at its outer end, a medial crank portion 3 and a lower portion 4. The crank 3 pivotally supports a circular modulus or measuring disc 10 by means of a pin 30 fixed to the crank laterally thereof. The lower portion 4 of the centering leg has an adapter 5 mounted thereon into which a centering guide member 14 is fitted and retained by a screw and knurled nut 6. This arrangement permits the substitution of centering guide members of different sizes as desired by the user.

The pantograph comprises a bow 20 which revolves around the upper portion 3 and lower portion 4 of the centering leg. A pair of parallel links 24 are pivoted at their inner ends to the bow as at 28 and are pivoted at their outer ends to the straight scriber leg 23 of the pantograph. The straight leg 23 is held against the edge of the circular modulus 10 by a leaf spring 19 fixed in a slot in the upper portion of the bow by a screw 21. The bow 20 is reinforced by a rib on its outer top and lower parts to give it the necessary weight to balance the pantograph, and as an aid in its rotary movement around the centering leg A. The bow 20 has an engraved angular scale 22 divided into marks of 5° each with 15° indications from 0° up to 75° which covers the range of the ellipsograph and is within the range normally used for ellipses.

A sleeve 9 with a knurled top 8 is fixed at the top of the bow 20 to aid in the operation of the ellipsograph by the user's finger and thumb, and is located so as not to interfere with the pantograph, the spring 19 and its retaining screw 21.

The straight leg 23 of the pantograph has in its lower end a tightening screw 27 to hold the adapter 25 in the desired position for the scribing point or stylus 26, which is fixed therein by means of a screw and circular knurled nut 6. The scribing point can have a graphite point 12 or a pen, or any kind or type of point to accomplish the desired objective. Also, it can receive an extension leg for tracing larger ellipses.

As will be seen from FIG. 2, the centering guide comprises a pin 7 having a slot 18 on its upper end, oriented along the axis of the fixed pin 30 of the circular modulus 10 and at 90° with respect to the horizontal axis of the base 14 in which the position pins 15 and 16 are lined up and fixed. The central pin 16 is longer than the two side pins 15 to aid in positioning the centering guide in the intersection of the conjugated axes of the ellipse. The two smaller pins 15 are lined along the major axis of the ellipse to be traced and then pressed in place, thus fixing the correct position of the circular modulus 10 and consequently positioning the ellipsograph itself for operation. This centering guide can be replaced by smaller or larger ones according to the size of ellipses to be drawn, which is accomplished by loosening the knurled nut 6 and inserting another centering guide of the desired size.

As shown in FIG. 3, the circular modulus comprises a hard alloy disc 10 held in place by two grooved and matching circular plates 11 attached to each other by two adjusting screws 13 placed one on each side of the modulus. The adjusting screws 13 serve two purposes, namely, to hold the plates 11 carrying the disc 10 firmly in position, and to fix the modulus in the selected angle as marked in the angular scale 22 by tilting and tightening the plates 11 around the smooth ends of the fixed pin 30 shown in FIG. 4.

An inclined slot 29 at the center of each of plates 11 allows the angular movement of the modulus up to its extreme positions of operation, also the plates have two spaced apart centrally disposed grooves 17 to receive the smooth ends of the pin 30 of FIG. 4, said grooves being at right angles to the inclined slot 29. The pin 30 has a central knurled part for more positive attachment to the crank 3. The ends of the pin which extend beyond the vertical sides of the crank are round and smooth to support the modulus, allowing tilting and fixation of the same in the desired angular position by means of the screws 13.

I am aware that there are many known devices to draw ellipses, such as those including a template with fixed size ellipses, and other types which are cumbersome and include sophisticated mechanisms for drawing larger ellipses. My device, however, is a simple and universal instrument for drawing any kind and size of ellipses which possesses the advantages set forth above.

I claim:

1. An ellipsograph of the compass type comprising, a multi-section centering leg including upper, medial and lower sections, a pantograph rotatably mounted on said upper and lower sections, a circular modulus member, means pivotally mounting said modulus member on said medial section, a straight leg, means pivotally connecting said straight leg to said pantograph, said straight leg disposed parallel to said centering leg, means urging said straight leg into contact with the peripheral edge of said circular modulus member, a stylus releasably secured to the lower end of said straight leg, a centering guide releasably secured to the lower end of the lower section of said centering leg, said circular modulus member including a circular disc having a central opening, a pair of circular plates between which said disc is mounted, means connecting said plates together, said plates each including inclined slots in the center thereof, and spaced, centrally disposed grooves normal to and communicating with said inclined slots, said spaced grooves cooperating with said means for pivotally mounting said modulus member on said medial section.

2. An ellipsograph according to claim 7, wherein said pantograph includes a bow-shape portion with a scale thereon, said scale disposed opposite said circular modulus member.

3. An ellipsograph according to claim 7, wherein the medial portion of said centering leg is crank-shaped and the means pivotally mounting said modulus member includes a pin member fixed at its center to said crank laterally thereof, the free ends of said pin projecting beyond the vertical plane of said medial portions of the centering leg.

4. An ellipsograph according to claim 1, wherein the means pivotally connecting said straight leg to said pantograph comprises a pair of links.

5. An ellipsograph according to claim 4, wherein the means urging said straight leg into peripheral contact with the peripheral edge of said circular modulus member comprises a leaf spring fixed at one end to the upper end of said pantograph, the other end of said spring bearing against one of said links.

* * * * *